Sept. 6, 1949.  A. A. BURCKLE  2,481,001
COUPLING FOR FLEXIBLE HOSE
Filed Jan. 1, 1945  2 Sheets-Sheet 1

INVENTOR.
ARTHUR A. BURCKLE.
BY
Herbert A. Huebner
ATTORNEY.

Sept. 6, 1949.  A. A. BURCKLE  2,481,001
COUPLING FOR FLEXIBLE HOSE
Filed Jan. 1, 1945  2 Sheets-Sheet 2

INVENTOR.
ARTHUR A. BURCKLE.
BY
ATTORNEY.

Patented Sept. 6, 1949

2,481,001

UNITED STATES PATENT OFFICE 2,481,001

COUPLING FOR FLEXIBLE HOSE

Arthur A. Burckle, Burbank, Calif., assignor, by mesne assignments, to Aeroquip Corporation, Jackson, Mich., a corporation of Michigan Application January 1, 1945, Serial No. 570,838

1 Claim. (Cl. 285—84)

This invention relates to the coupling terminals of very high pressure flexible fluid hose. The invention comprises a coupling structure, the combination of the coupling structure and the hose, the method of producing the coupling structure and the method of attaching it to the hose.

A terminal connection or coupling for very high pressure flexible fluid hose must be fluid tight, and also resistant to exceedingly high stresses which tend to rupture the connection between the hose and the coupling.

It is a broad object of my invention to produce a coupling structure and a hose-coupling combination embodying improvements over prior couplings and combinations of the same class. The hose per se is not novel with me, but the coupling structure of this invention embodies novel features, and when attached to a hose, in the manner disclosed herein, the terminal thus formed also embodies novel combination features.

A more particular object of the invention is to produce a coupling having a sleeve member with an internal bore having an enlargement at the end where the hose is introduced, which facilitates the entry of the hose therein, such enlargement having its greatest internal diameter spaced from the open end of the sleeve and tapering to a smaller diameter at such end whereby, when the sleeve is reduced by a drawing operation, the enlarged portion of the sleeve will contract upon the hose with a locking action.

Another object of the invention is to produce a coupling structure of the character described having a hollow stem member to be inserted in the hose, such stem being formed with an annular recess near the end which enters the hose, such recess being generally in the diametric plane region of the enlargement in the sleeve, the end of the stem co-operating with the end of the sleeve to provide a contracted end grip on the hose, while the annular recess in the stem in co-operation with the recessed portion of the sleeve enlargement provides an overflow pocket for rubber which seeks relief when the sleeve is contracted upon the hose.

A still further object of the invention is to provide a coupling in which the hose engaging sleeve is formed with an efficient gripping surface.

An additional object of the invention is to employ a method of fabricating the coupling wherein the stem is initially formed with a restricted bore diametrically within the region where external threads are provided for engaging the sleeve, and after threading the stem into the sleeve, the restricted bore is enlarged by expansion which compresses the co-operating threaded portions together, thus rendering the union permanent, after which, the bore may be finished by reaming.

Another object is to provide a method of fabricating a coupling structure of the character described including a method of connecting the structure to the end portion of a hose utilizing a plurality of die-forming or broaching operations, wherein advantage is taken of time intervals between successive drawing operations during which time rubber portions of the hose are deformed and reformed and the rubber is subjected to natural curing during the time periods mentioned.

Other objects and advantages will appear and be brought out more fully in the following specification considered with reference to the accompanying drawing throughout which like parts are designated by like numerals.

Flexible hose, as a conductor of fluids including both liquids and air and gases, has many important industrial applications, and in its use, terminal connections or couplings are necessary, as is well-known, both for joining together sections of such hose, as well as attachment of an end of the hose to a machine or device for supplying or receiving or utilizing the fluid medium. A hose of the character under consideration is customarily made of a plurality of layers usually including an inner tubular portion of rubber having formed on the outside thereof, a re-inforcing layer or layers of fabric, and in numerous cases a re-inforcing layer of twisted wire or spirally wound strips of metal, the exterior wall of the hose commonly comprising a second layer of rubber.

Terminal or coupling structures connected to the end of the hose generally comprise a sleeve which overlies the external end portion of the hose and a hollow stem element which extends into the end bore of the hose, the hose being secured or clamped to the sleeve, or stem, or both in various ways. The hose being flexible, the portion of the hose immediately adjacent the coupling structure is customarily subjected to more wear than other portions of the hose farther removed because of sharp bending at this region, and in prior art structures the coupling connections have broken down because a coupling relation has not been properly formed between the coupling element and the hose so as to prevent fracture or leakage of the hose, and this problem has been accentuated in cases where the hose is to be operated at extremely high pressures, which aggravates the conditions mentioned and results in an early rupture of the hose coupling connection.

My present invention contemplates overcoming the difficulties and disadvantages mentioned in coupling structures heretofore known, by providing a metallic coupling structure comprising a sleeve and a stem, which together provide an annular recess or cavity into which the end portion of a hose may be placed and secured therein, the end portion of the hose having been properly formed or stripped for the connection. After the end of the hose has been inserted in the cavity the coupling structure is subjected to a die-forming draw, swage or broaching operation which clamps the end of the hose between the sleeve and the stem in such manner as to provide a perfect mechanical and fluid tight coupling connection, wherein likelihood of damage to the hose during use is at a minimum.

The advantageous features of my invention can be understood and appreciated from the more detailed description of the structure, method of fabrication, assembly, and use which follows, considered in connection with the accompanying drawings which illustrate preferred forms of the invention, but which are not to be considered as limiting the invention to the forms shown.

Figure 7:
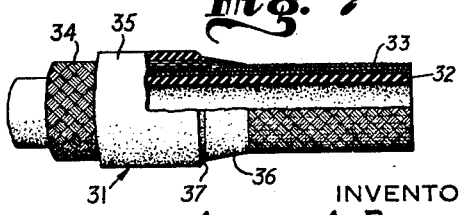
Figure 7 is a side view, partly in section, showing the end portion of a hose which has been stripped to the proper configuration for engagement with the coupling structure.

Referring more particularly to the drawings, the invention comprises a coupling structure consisting of a sleeve member or element 11 and a stem member or element 21, assembled and secured together to form substantially a unitary structure by the method or methods described more fully hereinafter. The coupling structure 11—21 is secured to the end portion of a flexible hose 31 which has been suitably prepared or stripped, as shown in Figure 7, the end portion of the hose being positioned in an annular recess formed by a bore in member 11 and the external portion of the stem 21 which is extended into the tubular bore of the hose.

Sleeve member 11 is formed with one end wall 12 and an opposite annular end wall portion 13 and has a longitudinal bore 14, a reduced portion 14a of which adjacent end wall 12 is threaded, a central or intermediate portion 15 of which is substantially cylindrical, and a portion 16 adjacent end portion 13 which is provided with a taper which narrows to its smallest diameter at the edge of portion 13, an inner more sharply tapered portion 17 being provided between tapered portion 16 and cylindrical portion 15, cylindrical portion 15 being generally of smaller diameter than the smallest diametrical portion of tapered portion 16. The cylindrical portion 15 is preferably provided with a plurality of spaced annular grooves 19 and a plurality of spaced longitudinal grooves 20, which grooves serve as recesses or pockets into which portions of the hose will be forced during the assembly of the coupling to the hose, resulting in an extremely tight connection, as will be illustrated in a more detailed manner hereinafter.

Stem member 21 comprises an elongated body portion 22, generally cylindrical in shape, formed with a main bore 23, in which is a fillet 24 forming a reduced bore 23a which is enlarged to the size of bore 23, during a step in the fabrication and assembly of the structure. Body portion 22 has an enlarged diametrical threaded portion 25 disposed substantially opposite reduced bore 23a, and a collar portion 26, which is preferably formed hexagonal in outer contour for the application of a wrench or other tool, when attaching the coupling to another coupling element or device to which hose attachment is desired. An end portion 27 of the stem 21 is provided with any suitable means for attachment to another hose coupling element or device and, in the form shown, is threaded, however, other forms of attachment may be incorporated into the stem end portion 27 if desired. Body portion 22 of the stem has a rounded or tapered end 28 and a curve-sectioned annular groove 29 adjacent thereto, which groove is substantially opposite tapered bore portion 16 of sleeve 11 when the parts are assembled. Body portion 22 preferably is further provided with a plurality of circular grooves 30 which form recesses into which portions of the rubber wall 32 are forced in order to effect a firm grip on the hose by the coupling, in accordance with the detailed description thereof. The usual complementary coupling would employ a threaded collar (not illustrated) and the stem would have a countersink, for engagement with the end portion 27.

The several views in the drawings show an end part of a hose 31 which is of a construction and formation which I may prefer to use to form the coupling of this invention. Hose 31 comprises an interior tube 32 of rubber, synthetic rubber, or similar material. External to tube 32 is a metallic re-inforcing layer 33 which may comprise one or more strata of spirally arranged or twisted or braided wires, or this formation may comprise strips or ribbons of metallic content and suitably formed to provide flexibility for the hose. External to the re-inforcing layer 33 is a fabric layer 34 in which the threads or cords comprising the fabric may be arranged according to any preferred pattern, which pattern is commonly a weave. External to the fabric layer 34 is a second layer 35 of rubber or synthetic rubber or cotton braid preferably impregnated with rubber or synthetic rubber which forms the external wall of the hose.

Figure 8:
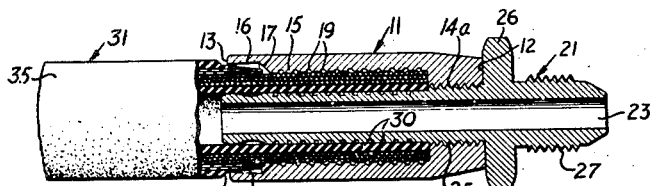
Figure 8 is a view showing the coupling structure and end portion of the hose in section and illustrating the initial step of joining the coupling to the end of the hose.
Figure 8A:
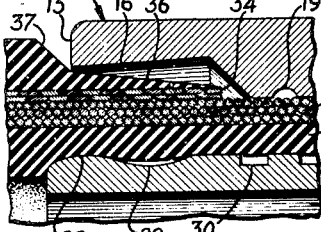
Figure 8A is an enlarged fragmentary sectional view showing more clearly the relationship of the end of the coupling element and the hose, the parts being in the same relative position as in Figure 8.

Figure 7 shows the end portion of the hose suitably prepared by stripping before or preliminary to its association with sleeve 11 and stem 21 to form the coupling, and in this figure the outer rubber layer 35 is stripped off of fabric layer 34 a distance from the end corresponding to the depth of bore 15, and the remaining end portion of the layer 35 is tapered at 36 and 37, taper 37 being relatively sharp, and taper 36, which forms a continuation thereof, being relatively gradual, so as to fit within bores 16 and 17 of the sleeve when the end of the hose is introduced into bore 15, as shown in Figures 8 and 8A.

Instead of the metal reinforcement in the hose, it has been found sufficient for many purposes to employ a cotton braid or woven layer, which is left exposed for direct contact with the interior of the coupling sleeve.

Figure 1:
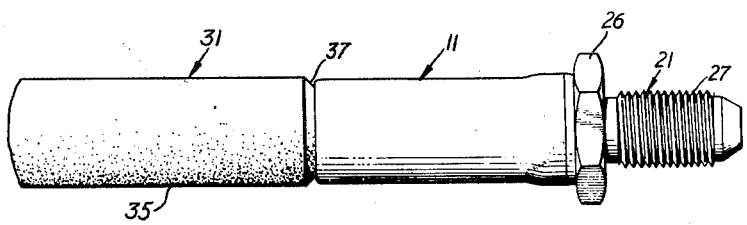
Figure 1 is a side view of a coupling structure and a portion of the attached flexible hose, embodying my invention.
Figure 3:
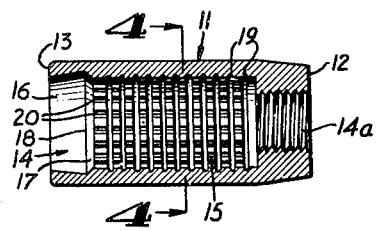
Figure 3 is a view in longitudinal section of the sleeve member of the structure shown in Figure 1.
Figure 2:
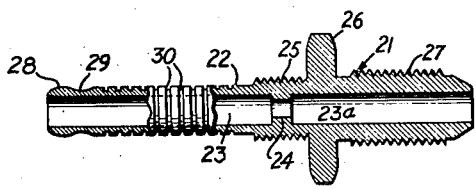
Figure 2 is a view in longitudinal section of the stem member forming a part of the structure shown in Figure 1.

Figure 2 shows the configuration of stem 21 as manufactured, and the initial step in the assembly of the coupling is the threading of sleeve 11 on stem 21 with threaded portions 14 and 25, respectively, being engaged, and end 12 of the sleeve tightened against collar 26. Bore 23a of the stem is then enlarged by a suitable draw or die operation which forces fillet 24 into the wall, on which threaded portion 25 is formed, compressing the wall material into the grooves of threaded portion 14a of sleeve bore 14, thereby making a substantially rigid and integral connection. Bore 23 is then reamed to a smooth and continuous uniform diameter, as appears in Figures 8, 9 and 10.

The next step in the assembly of hose and coupling is the placing of the stripped end of the hose 31 into the space formed between bore 15 of the sleeve and portion 22 of the stem, as shown in Figures 8 and 8A. Tapered portion 36 of the outer rubber layer 35 will be positioned in tapered bore 16 while tapered portion 37 of the rubber layer will be external and adjacent to annular end portion 13 of the sleeve.

Figure 9:
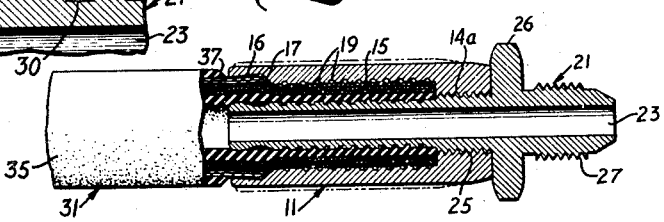
Figure 9 is a view similar to Figure 8 showing the parts after the first drawing operation.
Figure 10:
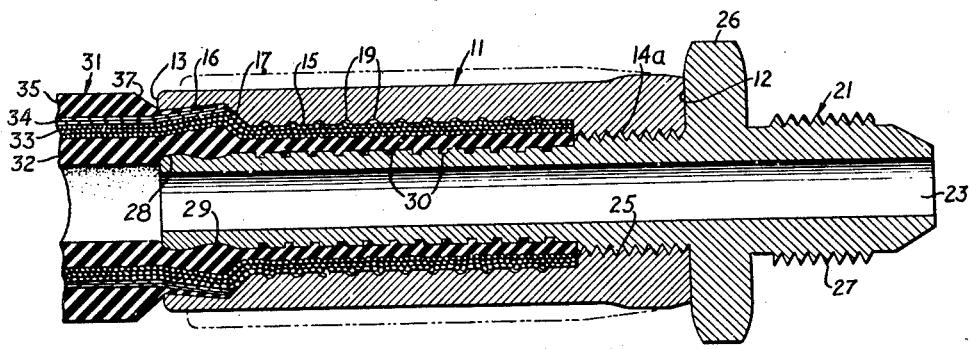
Figure 10 is a view similar to Figure 9, enlarged, showing the parts as formed after the second and final drawing operation.
Figure 10A:
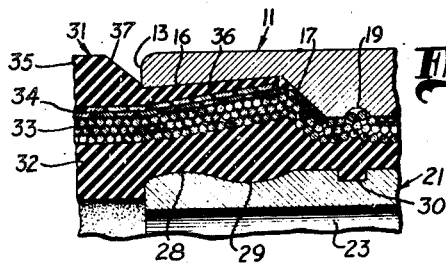
Figure 10A is a further enlarged fragmentary sectional view showing the end portion of the coupling structure and the engaged portion of the hose, when combined as in Figure 10.

The sleeve and stem assembly is then subjected to a die-stamping or draw operation, whereby the sleeve is reduced in diameter, and slightly elongated, including end portion 13, as seen in Figure 9, and the hose wall partially compressed, some of the rubber of layer 32 being forced into grooves 30 of the stem, and the re-inforcing layer 33 being partially forced into grooves 19 and 20 of the sleeve. This die operation also results in a partial bending or crimping of the hose wall configuration, such that tapered portion 36 of the outer wall layer 35 is flattened out, and the re-inforcing layer 33 given a partial crimp or bend due in part to the effect of curved end portion 28 of the stem.

Preferably after a period of time, which may be from three to six days, the second die or draw operation is applied to the sleeve 11, which further reduces the outer diameter along the length thereof which includes bore 15, resulting in a further compression of the wall portions of the hose and forcing rubber layer 32 firmly into grooves 30 and the re-inforcing layer 33 into grooves 19 and 20.

While the second draw may immediately follow the first, it is advantageous to allow the rubber a time to become readjusted to the distortion caused by the first draw before subjecting it to the second draw. The draw causes a disturbance of the rubber (or synthetic rubber) molecules, and a natural cure will occur over a period of three to six days.

Annular groove 30 and tapered recesses 16 and 17 form a pocket, and in this second draw operation, which exerts a compression stress on rubber layer 32, tapered portion 36 of the outer rubber layer and the re-inforcing layer 33, together with the fabric layer 34, are forced into the pocket thus formed by this force applied to rubber layer 32. Inasmuch as rubber is uncompressible, the volume of the hose wall portion, which would exceed the space provided between bore 15 and body portion 22, will flow out through the end of the annular groove thus formed, resulting in an appreciable, but not damaging, stretch in the hose wall structure. A considerable volume of such displaced rubber will lodge in the pocket adjacent the groove 29. Annular end 13 of the sleeve will engage the meeting edge of tapered portions 36 and 37 of the outer rubber wall, and it will be seen that taper 37 is such as to allow a reasonable amount of bending or flexing of the hose in this region without resulting in undue destructive wear or fracture of the hose wall, or exposure of the metal reinforcement to corroding influence.

After the second draw operation, the coupling assembly preferably is again stored for a like period of from three to six days, which periods of inactivity or non-use improve the physical and chemical properties of the rubber (or synthetic rubber) due to a resulting curing which appears to re-align the molecular or cellular structure thereof after the compressible action of the die or drawing operations. The notch binds the rubber in the pocket formation, as stated, and pushes back the fabric layer under the outer rubber layer and provides an effective bond which otherwise might pull apart in joints not perfectly formed, as is true of prior structural assemblies. The clamping effect produced by annular end 13 and the pocket formation, as stated, affords a firmly sealed grip on the metal reinforcing layer 33 (or on the cotton layer if there is no metal reinforcement) and protects the metal from corrosion due to flexing or contact with chemically active solvents or fluids which it may come in contact with. This clamping action is in the nature of a gripping and pulling, instead of pushing of the outer rubber layer 35 particularly. The tapered portion 36 thereof and the surplus rubber fills the pocket formed by tapered bores 16 and 17 and the pocket formed by annular groove 29 in the stem, and thus prevents blisters which might otherwise occur from a backing up or bulging of the inner rubber layer 32.

Figure 5:
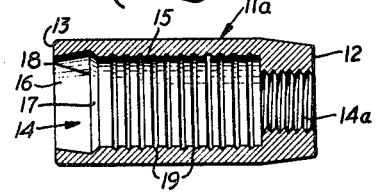
Figure 5 is a view similar to Figure 3 showing a sleeve member having modified hose engaging features.
Figure 4:
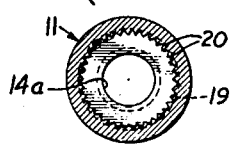
Figure 4 is a cross section view taken along the line 4—4 of Figure 3.
Figure 6:
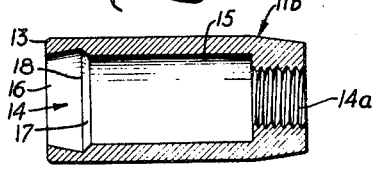
Figure 6 is a view similar to Figure 3 showing a sleeve element having further modified hose engaging features.

In Figures 5 and 6 I show modified forms of sleeve members. Figure 5 shows a sleeve 11a substantially similar to sleeve 11 except that longitudinal grooves 20 are omitted, circular grooves 19, however, being provided in portion 15 of bore 14. Grooves 19 without grooves 20 provide a substantially rough surface for bore 15 and afford sufficient gripping action for many uses in which the coupling may be used.

In Figure 6 I show a sleeve 11b which is similar to sleeve 11a of Figure 5 with the omission of grooves 19. The plane bore portion 15 of this figure, together with the deforming and clamping action of the hose wall in the pocket formed by bore portions 16 and 17, provide a sufficient clamping and gripping of the hose wall in many instances, and further simplify the manufacture of the coupling when this form of sleeve is deemed satisfactory.

The features of the invention disclosed are important irrespective of the means of securing the sleeve and stem together, while such means has advantages, other structural and retaining elements may be employed in a coupling having the hose gripping features disclosed.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent devices and methods.

Having thus described my invention, what I claim and desire to secure by Letters Patent is:

A coupling structure for flexible hose comprising a stem formed with a main bore and having a portion adapted to be inserted in the end portion of a hose and having a threaded sleeve engaging portion adjacent thereto, and a sleeve having a hose receiving bore and a threaded stem engaging portion, said stem bore having a fillet opposite said sleeve engaging portion, said fillet and said sleeve engaging portion of said stem being adapted to be expanded under pressure to effect a tight engagement with said sleeve in excess of normal thread engagement therebetween.

ARTHUR A. BURCKLE.

REFERENCES CITED

The following references are of record in the file of this patent:

UNITED STATES PATENTS

| Number | Name | Date |
|---|---|---|
| 1,928,836 | Loughead | Oct. 3, 1933 |
| 1,942,829 | Pentz | Jan. 9, 1934 |
| 2,147,356 | Scholtes | Feb. 14, 1939 |
| 2,288,684 | Couty | July 7, 1942 |
| 2,321,991 | Butler | June 15, 1943 |
| 2,360,761 | Clickner | Oct. 17, 1944 |